United States Patent
Liu et al.

(10) Patent No.: US 12,353,911 B2
(45) Date of Patent: Jul. 8, 2025

(54) METHOD, ELECTRONIC DEVICE, AND COMPUTER PROGRAM PRODUCT FOR SCHEDULING COMPUTING RESOURCES

(71) Applicant: Dell Products L.P., Round Rock, TX (US)

(72) Inventors: Jinpeng Liu, Shanghai (CN); Jiacheng Ni, Shanghai (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 17/715,173

(22) Filed: Apr. 7, 2022

(65) Prior Publication Data

US 2023/0297420 A1    Sep. 21, 2023

(30) Foreign Application Priority Data

Mar. 15, 2022  (CN) .......................... 202210255841.1

(51) Int. Cl.
  *G06F 9/48*   (2006.01)
  *G06N 3/084*   (2023.01)
(52) U.S. Cl.
  CPC ........... *G06F 9/4881* (2013.01); *G06N 3/084* (2013.01)
(58) Field of Classification Search
  CPC ..... G06F 9/4881; G06F 9/5011; G06N 3/084; G06N 3/0455
  See application file for complete search history.

(56) References Cited

U.S. PATENT DOCUMENTS

| | | |
|---|---|---|
| 11,061,731 B2 | 7/2021 | Zhao et al. |
| 2012/0209989 A1 | 8/2012 | Stewart et al. |
| 2014/0118355 A1 | 5/2014 | Vassilvitskii et al. |
| 2014/0380322 A1 | 12/2014 | Ailamaki et al. |

(Continued)

OTHER PUBLICATIONS

Wikipedia, "Intermediate Representation," https://en.wikipedia.org/w/index.php?title=Intermediate_representation&direction=next&oldid=905361000, Mar. 16, 2022, 4 pages.

(Continued)

*Primary Examiner* — Sisley N Kim
(74) *Attorney, Agent, or Firm* — Ryan, Mason & Lewis, LLP

(57) ABSTRACT

Embodiments of the present disclosure relate to a method, an electronic device, and a computer program product for scheduling computing resources. In a method for scheduling computing resources provided by embodiments of the present disclosure, a computing graph for a neural network is acquired, wherein the computing graph includes at least a plurality of nodes, and each node includes at least an operator for forward propagation of the neural network and a gradient operator of the operator for back propagation of the neural network; and computing resources for the neural network are scheduled based on the computing graph. In this way, a correlation of operators between forward propagation and back propagation may be preserved. In addition, there is no need to schedule computing resources again during back propagation. Resource scheduling for forward propagation and back propagation may be completed simultaneously with only one scheduling operation.

15 Claims, 5 Drawing Sheets

(56) References Cited

U.S. PATENT DOCUMENTS

| | | | |
|---|---|---|---|
| 2018/0075098 | A1 | 3/2018 | Yin et al. |
| 2018/0136912 | A1 | 5/2018 | Venkataramani et al. |
| 2018/0203673 | A1 | 7/2018 | Ravishankar et al. |
| 2018/0322387 | A1* | 11/2018 | Sridharan ............... G06F 9/547 |
| 2019/0324810 | A1 | 10/2019 | Zhao et al. |
| 2020/0334083 | A1 | 10/2020 | Liu et al. |
| 2020/0334544 | A1 | 10/2020 | Liu et al. |
| 2021/0034582 | A1 | 2/2021 | Liu et al. |
| 2021/0248002 | A1 | 8/2021 | Li et al. |
| 2022/0114475 | A1* | 4/2022 | Zhu ........................ G06N 3/084 |
| 2022/0300618 | A1* | 9/2022 | Ding ........................ G06N 5/01 |
| 2024/0311193 | A1* | 9/2024 | Li .............................. G06F 9/50 |
| 2024/0320512 | A1* | 9/2024 | Zhai ....................... G06N 3/098 |

OTHER PUBLICATIONS

Z. Jia et al., "Beyond Data and Model Parallelism for Deep Neural Networks," Proceedings of the 2nd SysML Conference, Palo Alto, CA, Jul. 2018, 13 pages.

Wikipedia, "Deep Learning," https://en.wikipedia.org/wiki/Deep_learning, Apr. 3, 2022, 38 pages.

Wikipedia, "Everything as a Service," https://simple.wikipedia.org/wiki/Everything_as_a_service, Mar. 25, 2022, 2 pages.

L. Song et al., "HyPar: Towards Hybrid Parallelism for Deep Learning Accelerator Array," arXiv:1901.02067v1, Jan. 7, 2019, 13 pages.

M. Memon, "Project Radium: Finally, Modern AI Infrastructure with Multi-Architecture Support," https://octo.vmware.com/introducing-project-radium/, Oct. 5, 2021, 7 pages.

Intel, "PlaidML," https://www.intel.com/content/www/us/en/artificial-intelligence/plaidml.html, Accessed Dec. 30, 2021, 4 pages.

Tensorflow Core, "Introduction to Graphs and tf.function," https://www.tensorflow.org/guide/intro_to_graphs#polymorphism_one_function_many_graphs, Dec. 8, 2021, 18 pages.

Easy Tensorflow, "Graph and Session," https://www.easy-tensorflow.com/tf-tutorials/basics/graph-and-session, Accessed Dec. 30, 2021, 10 pages.

C. Szegedy et al., "Going Deeper with Convolutions," arXiv:1409.4842v1, Sep. 17, 2014, 12 pages.

* cited by examiner

METHOD, ELECTRONIC DEVICE, AND COMPUTER PROGRAM PRODUCT FOR SCHEDULING COMPUTING RESOURCES

RELATED APPLICATION(S)

The present application claims priority to Chinese Patent Application No. 202210255841.1, filed Mar. 15, 2022, and entitled "Method, Electronic Device, and Computer Program Product for Scheduling Computing Resources," which is incorporated by reference herein in its entirety.

FIELD

Embodiments of the present disclosure relate to the field of deep learning, and more particularly, to a method, an electronic device, and a computer program product for scheduling computing resources.

BACKGROUND

Deep learning applications are increasingly used in machine translation, chatbots, image classification, autonomous driving, and the like. Deep learning networks are also becoming more complex. For example, an advanced natural language processing (NLP) model known as Bidirectional Encoder Representations from Transformers (BERT) has many layers, and more computing resources are required to train such a deep learning model. Therefore, scheduling of computing resources is becoming increasingly important, in order to make computing more economical and reasonable.

SUMMARY

In a first aspect of the present disclosure, a method for scheduling computing resources is provided. The method includes acquiring a computing graph for a neural network, the computing graph comprising at least a plurality of nodes, each of the nodes comprising at least an operator for forward propagation of the neural network and a gradient operator of the operator for back propagation of the neural network. The method further includes scheduling computing resources for the neural network based on the computing graph.

In a second aspect of the present disclosure, an electronic device is provided. The electronic device includes a processor and a memory coupled to the processor. The memory has instructions stored therein which, when executed by the processor, cause the device to perform actions. The actions include acquiring a computing graph for a neural network, the computing graph comprising at least a plurality of nodes, each of the nodes comprising at least an operator for forward propagation of the neural network and a gradient operator of the operator for back propagation of the neural network. The actions further include scheduling computing resources for the neural network based on the computing graph.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Figure 1:
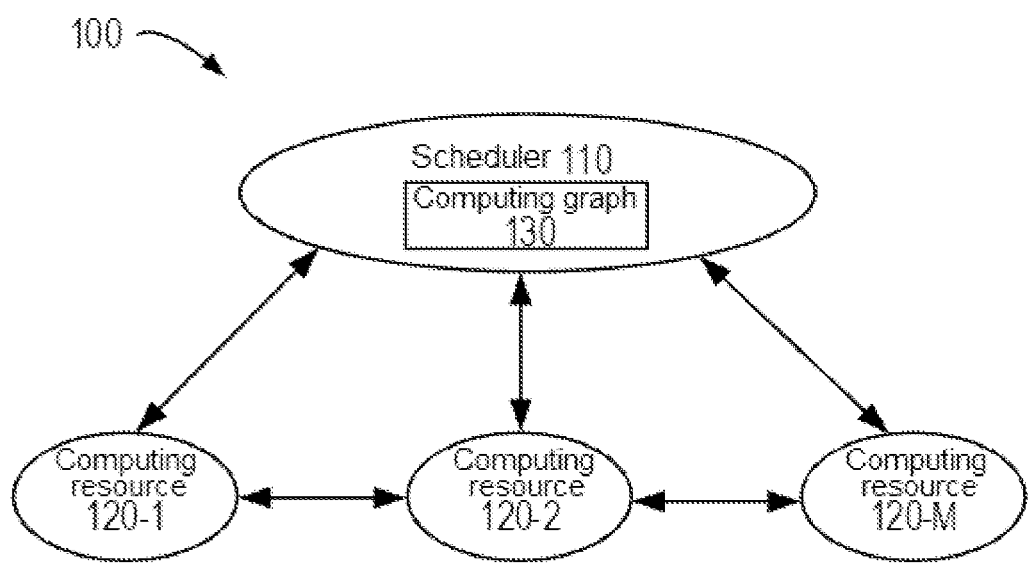
FIG. 1 shows a schematic diagram of an example environment in which embodiments of the present disclosure may be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As previously described, improved scheduling of computing resources in deep learning is needed in order to make computing more economical and reasonable. More and more solutions employ more refined resource scheduling solutions. For example, there is a scheduling solution based on a computing graph, which arranges training into a plurality of heterogeneous computing devices for parallel execution to schedule computing into a plurality of devices across central processing unit (CPU), graphics processing unit (GPU), and other accelerator processor architectures.

With this trend, more and more deep learning frameworks are redesigning a scheduling solution based on a computing graph to take advantage of available heterogeneous computing devices. A computing graph is usually defined as a direct acyclic graph (DAG) in almost all academic materials and deep learning framework documents. However, in a deep learning model that requires back propagation to update model parameters, a computing graph of the model is not a DAG, but a graph with many cycles. Therefore, some special processing is required for such a graph, so that the scheduling algorithm can work normally.

In some known solutions, a computing graph with many cycles is split into two sub-computing graphs. One of the sub-computing graphs is a DAG for forward propagation (hereinafter referred to as "first DAG"). The other sub-computing graph is a DAG for back propagation (hereinafter referred to as "second DAG"). The second DAG is a reverse graph of the first DAG. In forward propagation, computing resources are scheduled based on the first DAG for computing nodes in the first DAG. Usually, each node in the computing graph represents an operator in a neural network. Upon completion of the forward propagation, the computing resources are scheduled again based on the second DAG for computing nodes in the second DAG to complete the back propagation.

It can be seen that in such known solutions, the computing resources need to be scheduled twice, which is inefficient. In addition, since the first DAG and the second DAG are independent of each other, a correlation of operators between forward propagation and back propagation is lost in the two scheduling operations. Thus, computing for an operator and gradient computing for updating the operator may be scheduled onto different devices. As such, gradient operators for updating operators need to be transmitted between different devices. Gradient operators are usually tensors of very high dimensions. It is undesirable to transmit such large amounts of data between devices.

Embodiments of the present disclosure provide a solution for scheduling computing resources such that there is no need to use a graph with cycles even in model computations that require back propagation. According to various embodiments of the present disclosure, a computing graph including at least a plurality of nodes is acquired. The computing graph is a computing graph for a neural network. Each node includes at least an operator for forward propagation of the neural network, and a gradient operator of the operator. The gradient operator is used for back propagation of the neural network. Computing resources may be scheduled based on such a computing graph.

According to embodiments described herein, a correlation of operators between forward propagation and back propagation may be reserved by placing an operator for forward propagation and a gradient operator for back propagation in the same node of a computing graph. In addition, there is no need to schedule computing resources again during back propagation. Resource scheduling for forward propagation and back propagation may be completed simultaneously with only one scheduling operation.

Basic principles and some example implementations of the present disclosure will be described below with reference to the accompanying drawings. It should be understood that these example embodiments are given only to enable those skilled in the art to better understand and thus implement embodiments of the present disclosure, and are not intended to limit the scope of the present disclosure in any way.

FIG. 1 shows a schematic diagram of an example environment in which embodiments of the present disclosure may be implemented. As shown in FIG. 1, environment 100 includes scheduler 110, computing resource 120-1, computing resource 120-2, and computing resource 120-M, which may also be collectively or individually referred to as "computing resource 120," where M is a natural number. Scheduler 110 may acquire computing graph 130 locally or remotely.

It should be understood that although computing graph 130 is shown in FIG. 1 as being included in scheduler 110, this is merely for ease of illustration and is not intended to limit a subordinating relationship between scheduler 110 and computing graph 130.

Scheduler 110 schedules computing resources 120 based on acquired computing graph 130. Computing resources 120 may communicate with scheduler 110. Computing resources 120 may communicate with each other. In some embodiments, scheduler 110 may be disposed together with any of computing resources 120. In some embodiments, scheduler 110 may be disposed separately from computing resources 120.

Computing resources 120 may be a plurality of devices across CPU, GPU, and other accelerator processor architectures. Although only three computing resources 120 are shown in FIG. 1, the number of computing resources is not limited thereto, and more or fewer computing resources 120 may be included.

It should be understood that the structure and functions of environment 100 are described for illustrative purposes only and do not imply any limitation to the scope of the present disclosure. For example, embodiments of the present disclosure may also be applied to an environment different from environment 100.

Figure 2:
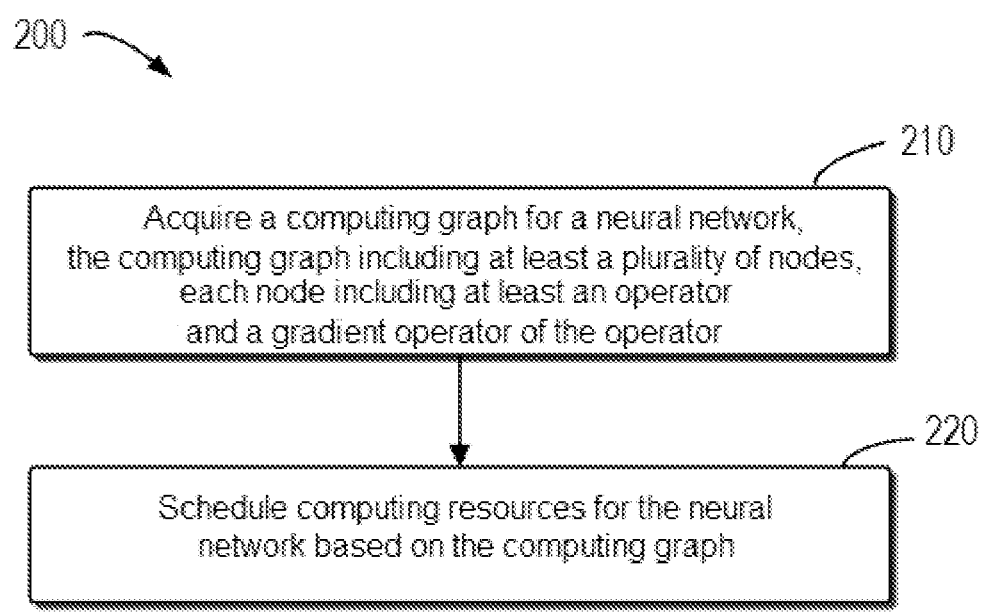
FIG. 2 shows a flow chart of an example method for scheduling computing resources according to embodiments of the present disclosure.

FIG. 2 shows a flow chart of example method 200 for scheduling computing resources according to embodiments of the present disclosure. Method 200 may be implemented by, e.g., scheduler 110 as shown in FIG. 1. It should be understood that method 200 may also include additional actions not shown and/or may omit actions shown, and the scope of the present disclosure is not limited in this regard. Method 200 will be described in detail below with reference to FIG. 1 and FIG. 3.

At block 210, scheduler 110 acquires computing graph 130 for a neural network. Computing graph 130 includes at least a plurality of nodes. These nodes are located at different layers of the neural network. Each node includes at least an operator and a gradient operator of the operator. The operator is used for forward propagation of the neural network. The gradient operator is used for back propagation of the neural network to update the operator.

Figure 3:
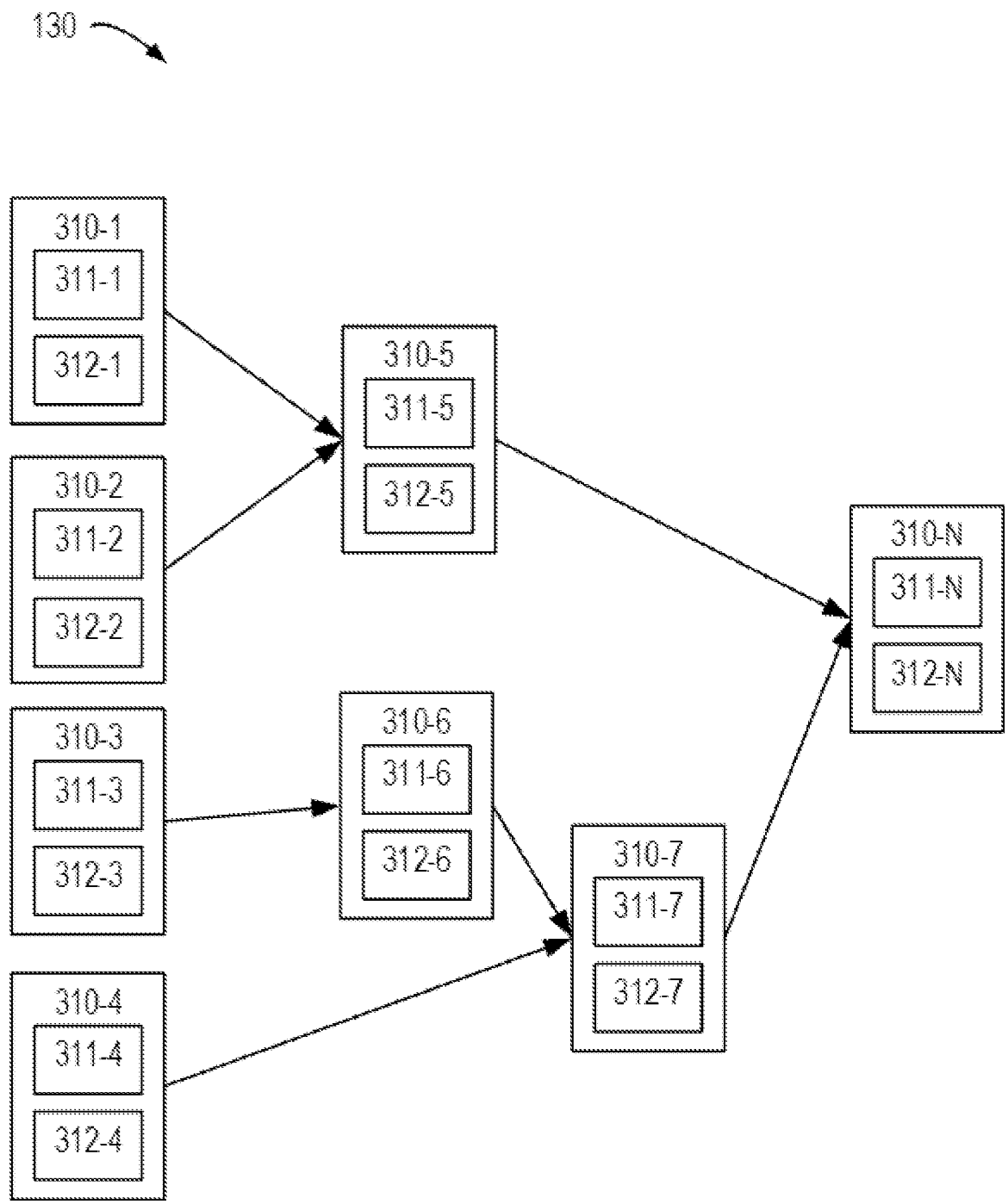
FIG. 3 shows a schematic diagram of a computing graph according to some embodiments of the present disclosure.

For example, FIG. 3 shows a schematic diagram of computing graph 130 according to some embodiments of the present disclosure. As shown in FIG. 3, computing graph 130 includes node 310-1, node 310-2, node 310-3, node 310-4, node 310-5, node 310-6, node 310-7, and node 310-N, which may also be collectively or individually referred to as "node 310," where N is a natural number.

It should be understood that although only 8 nodes 310 are shown in FIG. 3, the number of nodes is not limited thereto, and more or fewer nodes 310 may be included.

Operator 311-1, operator 311-2, operator 311-3, operator 311-4, operator 311-5, operator 311-6, operator 311-7, and operator 311-N (collectively or individually referred to as "operator 311") are included in corresponding nodes 310, respectively.

Gradient operator 312-1, gradient operator 312-2, gradient operator 312-3, gradient operator 312-4, gradient operator 312-5, gradient operator 312-6, gradient operator 312-7, and gradient operator 312-N(collectively or individually referred to as "gradient operator 312") are also included in corresponding nodes 310.

Gradient operator 312 is obtained by taking the derivative of operator 311. For example, gradient operator 312-1 is obtained by taking the derivative of operator 311-1. Gradient operator 312 can be used to update operator 311 in back propagation.

In this way, a correlation of operators between forward propagation and back propagation may be reserved by placing an operator for forward propagation and a gradient operator for back propagation in the same node of a computing graph.

Returning to FIG. 2, at block 220, scheduler 110 schedules computing resources 120 for the neural network based on computing graph 130.

Since the neural network needs to propagate forward first, scheduler 110 may schedule computing resources 120 based on computing graph 130 and using any known scheduling solution for DAG, so that operators 311 may be computed in parallel. The scope of the present disclosure is not limited in this regard.

For example, scheduler 110 may classify operators 311 that may be computed in parallel according to in-degrees of nodes 310. In-degree indicates the number of inputs of one node. Specifically, for a plurality of nodes 310 with the in-degree being zero, operators 311 thereof are computed in parallel. In the example shown in FIG. 3, in-degrees of node 310-1, node 310-2, node 310-3, and node 310-4 are zero. Therefore, operator 311-1, operator 311-2, operator 311-3, and operator 311-4 in these nodes may be executed in parallel.

Then, it is assumed that node 310-1, node 310-2, node 310-3, and node 310-4 are removed. At this moment, the nodes with the in-degree being zero are node 310-5 and node 310-6. Therefore, operator 311-5 and operator 311-6 may be executed in parallel.

Next, it is assumed that node 310-5 and node 310-6 are removed. At this moment, only node 310-7 has the in-degree of zero. Therefore, operator 311-7 is executed separately. Similarly, operator 311-N also needs to be executed separately.

After the neural network has completed forward propagation, back propagation is needed to update operators 311 to optimize the training of the neural network. In some embodiments, in the back propagation of the neural network, scheduler 110 computes gradient operator 312 of operator 311 using the same computing resources 120 as those for computing operator 311. For example, it is assumed that in forward propagation, computing resource 120-1 is scheduled for computing operator 311-1. Then, computing resource 120-1 is likewise used in back propagation to compute gradient operator 312-1.

In this way, there is no need to schedule computing resources again during back propagation. Resource scheduling for forward propagation and back propagation may be completed simultaneously with only one scheduling operation. In addition, since there is no need to transmit gradient operators between computing devices, the occupation of computing resources is reduced, and the computing efficiency is improved.

In some embodiments, the plurality of nodes 310 include at least a plurality of upper nodes 310 and a plurality of lower nodes 310. "Lower" and "upper" are relative rather than absolute. An upper and lower relative relationship between the lower nodes and the upper nodes illustratively refers to an arrangement in which an input to operator 311 in lower node 310 comes from an output from operator 311 in upper node 310, either directly or indirectly through intermediate node 310 to be described later.

In some embodiments, outputs from operators 311 in a plurality of first upper nodes of the plurality of upper nodes 310 are respective inputs to operators 311 in one or more first lower nodes of the plurality of lower nodes 310.

For example, node 310-1, node 310-2, and node 310-3 as shown in FIG. 3 are upper nodes of node 310-5 and node 310-6. Node 310-5 and node 310-6 are lower nodes of node 310-1, node 310-2, and node 310-3. An output from operator 311-1 in node 310-1 and an output from operator 311-2 in node 310-2 are respective inputs to operator 311-5 in node 310-5. An output from operator 311-3 in node 310-3 is an input to operator 311-6 in node 310-6.

At this moment, node 310-1, node 310-2, and node 310-3 may be referred to as first upper nodes, and node 310-5 and node 310-6 may be referred to as first lower nodes.

Resource scheduling for such first upper nodes and first lower nodes will be described in detail below with reference to FIG. 4.

Figure 4:
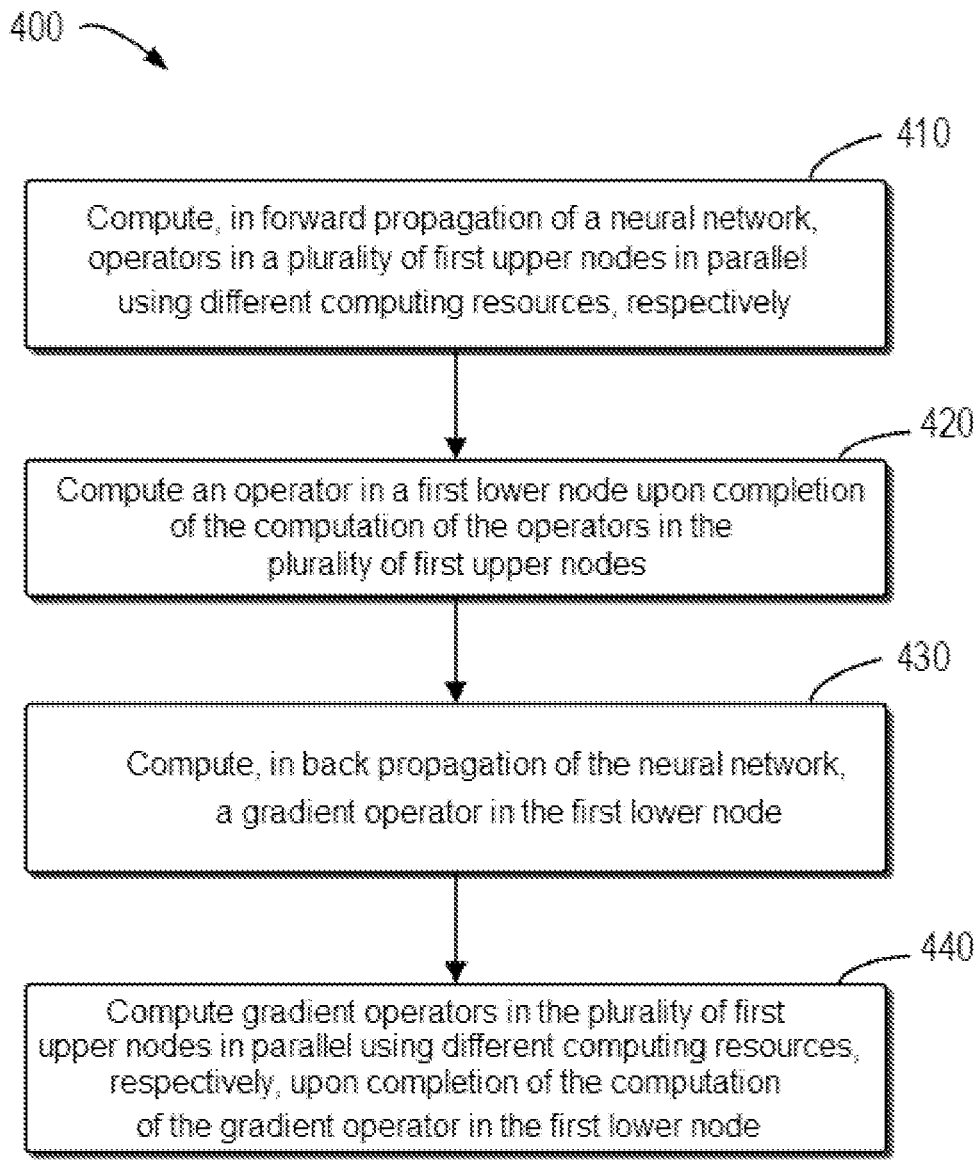
FIG. 4 shows a flow chart of an example method for scheduling computing resources based on a computing graph according to some embodiments of the present disclosure.

FIG. 4 shows a flow chart of example method 400 for scheduling computing resources 120 based on computing graph 130 according to some embodiments of the present disclosure. Method 400 may be regarded as an example implementation of block 220 in method 200. As shown in FIG. 4, at block 410, scheduler 110 computes operators (e.g., 311-1 and 311-2) in a plurality of first upper nodes (e.g., 310-1 and 310-2) in parallel using different computing resources (e.g., 120-1 and 120-2), respectively, in forward propagation of a neural network.

At block 420, upon completion of the computation of the operators (e.g., 311-1 and 311-2) in the plurality of first upper nodes (e.g., 310-1 and 310-2), scheduler 110 computes an operator (e.g., 311-5) in a first lower node (e.g., 310-5).

In this way, it can be ensured that the computation of an operator in a node starts only when an output from the operator in the node needs to be used. The entire computing graph can be computed using relatively few computing resources. Thus, computing resources are saved.

Then, at block 430, scheduler 110 computes a gradient operator (e.g., 312-5) in a first lower node (e.g., 310-5) in back propagation of the neural network. At block 440, upon completion of the computation of the gradient operator (e.g., 312-5) in the first lower node (e.g., 310-5), scheduler 110 computes gradient operators (e.g., 312-1 and 312-2) in the plurality of first upper nodes (e.g., 310-1 and 310-2) in parallel using different computing resources (e.g., 120-1 and 120-2), respectively.

In this way, it can be ensured that no computing resources need to be scheduled for back propagation again. Thus, the same number of computing resources as in forward propagation may be used to perform computing for back propagation.

In some other embodiments, the plurality of nodes 310 may also include a plurality of intermediate nodes 310. "Intermediate" refers to one or more layers between "upper" and "lower." An output from operator 311 in a second upper node of the plurality of upper nodes 310 is an input to operator 311 in a first intermediate node of the plurality of intermediate nodes 310. An output from operator 311 in a third upper node of the plurality of upper nodes 310 and an output from operator 311 in first intermediate node 310 are respective inputs to operator 311 in a second lower node of the plurality of lower nodes 310.

For example, node 310-3 and node 310-4 as shown in FIG. 3 are upper nodes of node 310-7. Node 310-7 is a lower node of node 310-3 and node 310-4. Node 310-6 is an intermediate node between node 310-3 and node 310-7. An output from operator 311-3 in node 310-3 is an input to operator 311-6 in intermediate node 310-6. An output from operator 311-4 in node 310-4 and an output from operator 311-6 in intermediate node 310-6 are respective inputs to operator 311-7 in node 310-7.

At this moment, node 310-3 may be referred to as a second upper node, node 310-4 may be referred to as a third upper node, node 310-6 may be referred to as a first intermediate node, and node 310-7 may be referred to as a second lower node.

In some embodiments, for such second upper node, third upper node, intermediate node, and second lower node, an operator (e.g., 311-3) in a second upper node (e.g., 310-3) is first computed in the forward propagation of the neural network. Upon completion of the computation of the operator (e.g., 311-3) in the second upper node (e.g., 310-3), an operator (e.g., 311-4) in a third upper node (e.g., 310-4) and an operator (e.g., 311-6) in a first intermediate node (e.g., 310-6) are computed in parallel using different computing resources (e.g., 120-2 and 120-M), respectively. Upon completion of the computation of the operator (e.g., 311-4) in the third upper node (e.g., 310-4) and the operator (e.g., 311-6) in the first intermediate node (e.g., 310-6), an operator (e.g., 311-7) in a second lower node (e.g., 310-7) is computed.

In this way, it can be further ensured that the computation of an operator in a node starts only when an output from the operator in the node needs to be used. The entire computing graph can be computed using fewer computing resources. Thus, computing resources are further saved.

Then, a gradient operator (e.g., 312-7) in a second lower node (e.g., 310-7) is computed in the back propagation of the neural network. Upon completion of the computation of the gradient operator (e.g., 312-7) in the second lower node (e.g., 310-7), a gradient operator (e.g., 312-4) in a third upper node (e.g., 310-4) and a gradient operator (e.g., 312-6) in a first intermediate node (e.g., 310-6) are computed in parallel using different computing resources (e.g., 120-2 and 120-M), respectively. Upon completion of the computation of the gradient operator (e.g., 312-4) in the third upper node (e.g., 310-4) and the gradient operator (e.g., 312-6) in the first intermediate node (e.g., 310-6), a gradient operator (e.g., 312-3) in a second upper node (e.g., 310-3) is computed.

In this way, it can be ensured that no computing resources need to be scheduled for back propagation again. Thus, the same number of computing resources as in forward propagation may be used to perform computing for back propagation.

Figure 5:
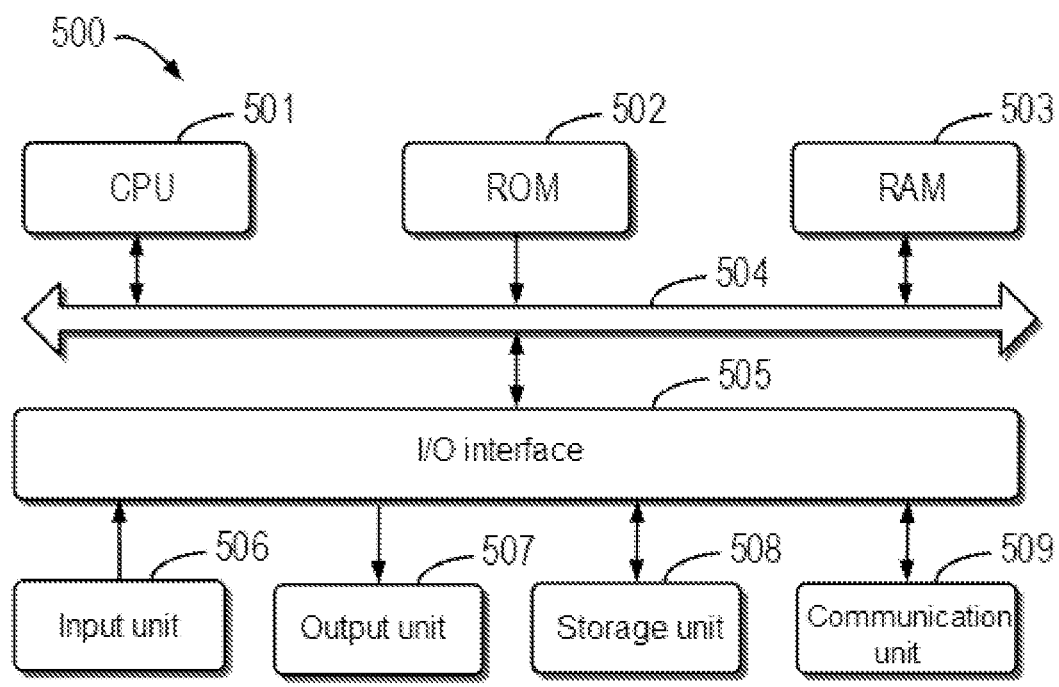
FIG. 5 shows a block diagram of an example device that may be used to implement embodiments of the present disclosure.

FIG. 5 shows a schematic block diagram of example device 500 that may be used to implement embodiments of the present disclosure. For example, scheduler 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as method 200 and method 400, may be performed by CPU 501. For example, in some embodiments, method 200 and method 400 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of method 200 and method 400 described above may be performed when the computer program is loaded into RAM 503 and executed by CPU 501.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method, comprising:
 acquiring a computing graph for a neural network, the computing graph comprising at least a plurality of nodes, each of the nodes comprising at least an operator for forward propagation of the neural network and a gradient operator of the operator for back propagation of the neural network; and
 scheduling computing resources for the neural network based on the computing graph;
 wherein the plurality of nodes comprise at least a plurality of upper nodes and a plurality of lower nodes, outputs from operators in a plurality of first upper nodes of the plurality of upper nodes are respective inputs to an operator in a first lower node of the plurality of lower nodes, and
 scheduling the computing resources based on the computing graph comprises:
 computing, in the forward propagation of the neural network, the operators in the plurality of first upper nodes in parallel using different computing resources, respectively; and
 computing the operator in the first lower node upon completion of the computation of the operators in the plurality of first upper nodes.

2. The method according to claim 1, wherein scheduling the computing resources based on the computing graph comprises:
 computing, in the back propagation of the neural network, the gradient operator of the operator using the same computing resources used for computing the operator.

3. The method according to claim 1, wherein scheduling the computing resources based on the computing graph further comprises:
 computing, in the back propagation of the neural network, a gradient operator in the first lower node; and
 computing gradient operators in the plurality of first upper nodes in parallel using different computing resources, respectively, upon completion of the computation of the gradient operator in the first lower node.

4. The method according to claim 1, wherein the plurality of nodes further comprise a plurality of intermediate nodes, an output from an operator in a second upper node of the plurality of upper nodes is an input to an operator in a first intermediate node of the plurality of intermediate nodes, and an output from an operator in a third upper node of the plurality of upper nodes and an output from the operator in the first intermediate node are respective inputs to an operator in a second lower node of the plurality of lower nodes, and scheduling the computing resources based on the computing graph comprises:

computing, in the forward propagation of the neural network, the operator in the second upper node;

computing the operator in the third upper node and the operator in the first intermediate node in parallel using different computing resources, respectively, upon completion of the computation of the operator in the second upper node; and computing the operator in the second lower node upon completion of the computation of the operator in the third upper node and the operator in the first intermediate node.

5. The method according to claim 4, wherein scheduling the computing resources based on the computing graph further comprises:

computing, in the back propagation of the neural network, a gradient operator in the second lower node;

computing a gradient operator in the third upper node and a gradient operator in the first intermediate node in parallel using different computing resources, respectively, upon completion of the computation of the gradient operator in the second lower node; and computing a gradient operator in the second upper node upon completion of the computation of the gradient operator in the third upper node and the gradient operator in the first intermediate node.

6. An electronic device, comprising:

at least one processor; and memory coupled to the at least one processor, the memory having instructions stored therein, wherein the instructions, when executed by the at least one processor, cause the electronic device to perform actions comprising:

acquiring a computing graph for a neural network, the computing graph comprising at least a plurality of nodes, each of the nodes comprising at least an operator for forward propagation of the neural network and a gradient operator of the operator for back propagation of the neural network; and scheduling computing resources for the neural network based on the computing graph;

wherein the plurality of nodes comprise at least a plurality of upper nodes and a plurality of lower nodes, outputs from operators in a plurality of first upper nodes of the plurality of upper nodes are respective inputs to an operator in a first lower node of the plurality of lower nodes, and scheduling the computing resources based on the computing graph comprises:

computing, in the forward propagation of the neural network, the operators in the plurality of first upper nodes in parallel using different computing resources, respectively; and computing the operator in the first lower node upon completion of the computation of the operators in the plurality of first upper nodes.

7. The electronic device according to claim 6, wherein scheduling the computing resources based on the computing graph comprises:

computing, in the back propagation of the neural network, the gradient operator of the operator using the same computing resources used for computing the operator.

8. The electronic device according to claim 6, wherein scheduling the computing resources based on the computing graph further comprises:

computing, in the back propagation of the neural network, a gradient operator in the first lower node; and computing gradient operators in the plurality of first upper nodes in parallel using different computing resources, respectively, upon completion of the computation of the gradient operator in the first lower node.

9. The electronic device according to claim 6, wherein the plurality of nodes further comprise a plurality of intermediate nodes, an output from an operator in a second upper node of the plurality of upper nodes is an input to an operator in a first intermediate node of the plurality of intermediate nodes, and an output from an operator in a third upper node of the plurality of upper nodes and an output from the operator in the first intermediate node are respective inputs to an operator in a second lower node of the plurality of lower nodes, and scheduling the computing resources based on the computing graph comprises:

computing, in the forward propagation of the neural network, the operator in the second upper node;

computing the operator in the third upper node and the operator in the first intermediate node in parallel using different computing resources, respectively, upon completion of the computation of the operator in the second upper node; and computing the operator in the second lower node upon completion of the computation of the operator in the third upper node and the operator in the first intermediate node.

10. The electronic device according to claim 9, wherein scheduling the computing resources based on the computing graph further comprises:

computing, in the back propagation of the neural network, a gradient operator in the second lower node;

computing a gradient operator in the third upper node and a gradient operator in the first intermediate node in parallel using different computing resources, respectively, upon completion of the computation of the gradient operator in the second lower node; and computing a gradient operator in the second upper node upon completion of the computation of the gradient operator in the third upper node and the gradient operator in the first intermediate node.

11. A computer program product that is tangibly stored on a non-transitory computer-readable medium and comprises machine-executable instructions, wherein the machine-executable instructions, when executed by a machine, cause the machine to perform actions comprising:

acquiring a computing graph for a neural network, the computing graph comprising at least a plurality of nodes, each of the nodes comprising at least an operator for forward propagation of the neural network and a gradient operator of the operator for back propagation of the neural network; and scheduling computing resources for the neural network based on the computing graph;

wherein the plurality of nodes comprise at least a plurality of upper nodes and a plurality of lower nodes, outputs from operators in a plurality of first upper nodes of the plurality of upper nodes are respective inputs to an operator in a first lower node of the plurality of lower nodes, and scheduling the computing resources based on the computing graph comprises:

computing, in the forward propagation of the neural network, the operators in the plurality of first upper nodes in parallel using different computing resources, respectively; and computing the operator in the first lower node upon completion of the computation of the operators in the plurality of first upper nodes.

12. The computer program product according to claim 11, wherein scheduling the computing resources based on the computing graph comprises:

computing, in the back propagation of the neural network, the gradient operator of the operator using the same computing resources used for computing the operator.

13. The computer program product according to claim 11, wherein scheduling the computing resources based on the computing graph further comprises:

computing, in the back propagation of the neural network, a gradient operator in the first lower node; and computing gradient operators in the plurality of first upper nodes in parallel using different computing resources, respectively, upon completion of the computation of the gradient operator in the first lower node.

14. The computer program product according to claim 11, wherein the plurality of nodes further comprise a plurality of intermediate nodes, an output from an operator in a second upper node of the plurality of upper nodes is an input to an operator in a first intermediate node of the plurality of intermediate nodes, and an output from an operator in a third upper node of the plurality of upper nodes and an output from the operator in the first intermediate node are respective inputs to an operator in a second lower node of the plurality of lower nodes, and scheduling the computing resources based on the computing graph comprises:

computing, in the forward propagation of the neural network, the operator in the second upper node;

computing the operator in the third upper node and the operator in the first intermediate node in parallel using different computing resources, respectively, upon completion of the computation of the operator in the second upper node; and computing the operator in the second lower node upon completion of the computation of the operator in the third upper node and the operator in the first intermediate node.

15. The computer program product according to claim 14, wherein scheduling the computing resources based on the computing graph further comprises:

computing, in the back propagation of the neural network, a gradient operator in the second lower node;

computing a gradient operator in the third upper node and a gradient operator in the first intermediate node in parallel using different computing resources, respectively, upon completion of the computation of the gradient operator in the second lower node; and computing a gradient operator in the second upper node upon completion of the computation of the gradient operator in the third upper node and the gradient operator in the first intermediate node.

* * * * *